Oct. 20, 1942.  E. R. MAYER, SR  2,299,243
INNER TUBE
Filed June 9, 1941

Edward R. Mayer, Sr.
INVENTOR
BY Victor J. Evans & Co.
ATTORNEYS

Patented Oct. 20, 1942

2,299,243

UNITED STATES PATENT OFFICE 2,299,243

INNER TUBE

Edward Rolland Mayer, Sr., Amarillo, Tex.

Application June 9, 1941, Serial No. 397,320

1 Claim. (Cl. 152—331)

The present invention relates to pneumatic tires and more particularly to improvements in inner tubes constituting a portion of such tires.

At the present time, it is customary to employ but a single inner tube in pneumatic tire casings, and when such tube is punctured or blown out, the tire is completely deflated. This necessitates a change of tires or wheels which is not always convenient to the operator of the vehicle. In addition, if the tire is blown out, it deflates very rapidly, creating a source of considerable danger, especially if the vehicle is travelling at a relatively high rate of speed at the time the blow-out occurs.

In accordance with the present invention, there is eliminated the necessity of changing tires when a puncture occurs and there is substantially eliminated the danger incident to a blow-out while the vehicle is in motion.

An important object of the invention, is, therefore, to provide a simple construction that will permit the continued use of the tire after a puncture or blow-out.

Another object is to provide a pneumatic tire having triple inner tubes arranged in the casing thereof in such a manner that upon the deflation of one tube, occasioned by a puncture or blow-out, the remaining tubes will carry the load without the necessity of immediate attention.

A further object of the invention is to provide an inner tube for pneumatic tires formed of a plurality of independently inflated, arcuate shaped tube members mounted in the tire casing in overlapping relation, whereby as one of the members becomes deflated through a puncture or blow-out, the adjacent member will be caused to expand against the aperture in the casing, the deflated member serving as a blow-out patch or shoe.

The invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which.

Figure 1:
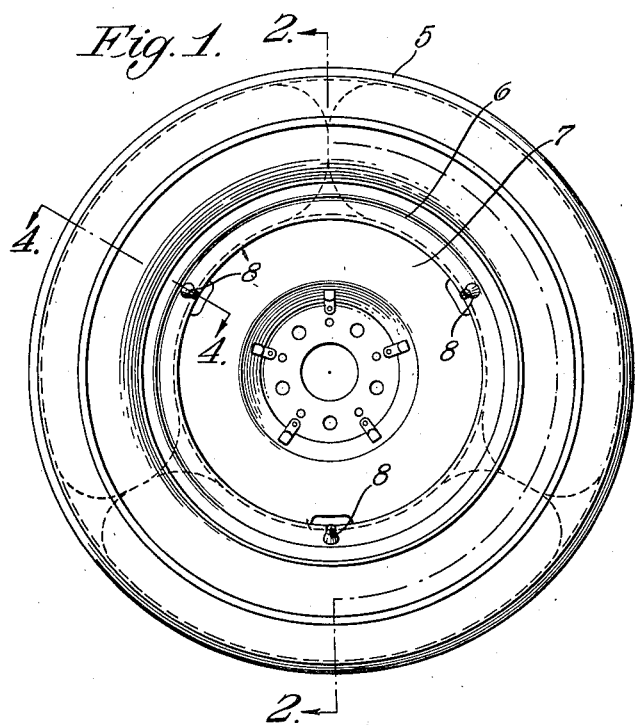
Figure 1 is a side elevational view of a pneumatic tire mounted on a vehicle wheel and including a plurality of tube members, in accordance with the present invention.

Referring more particularly to the drawing, there is illustrated a pneumatic tire 5 mounted on the rim 6 of a vehicle wheel 7. It will be observed that the rim 6 has three valve stems 8 protruding therefrom, said valve stems forming a part of the individual tube members which are positioned in the tire casing for inflating the same.

Figure 3:
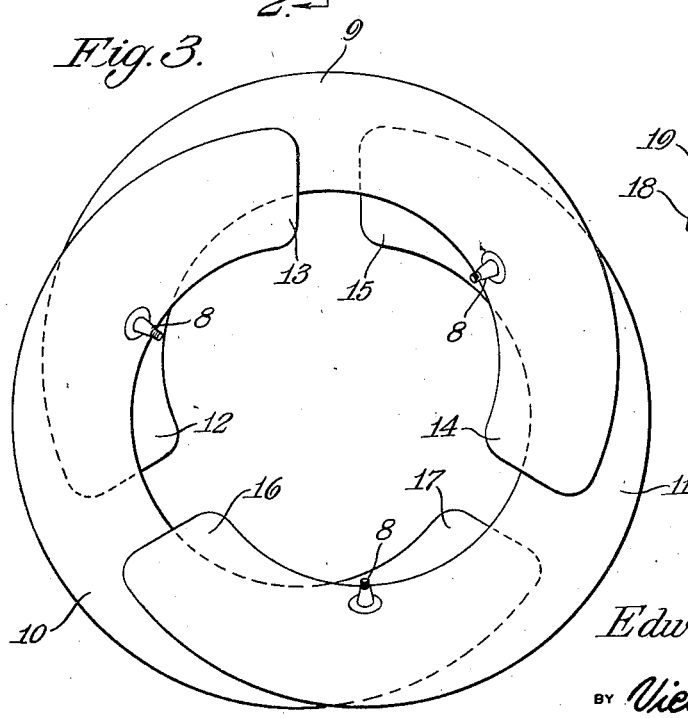
Figure 3 is a top plan view of the tube members removed from the tire and illustrating the manner in which they overlap when disposed in a tire casing.

In accordance with the present invention, the means for inflating the tire 5 comprises three arcuate or segmental shaped closed end tube members 9, 10 and 11, respectively. Each of these tubes is of a length greater than a semi-circle and forms a compartment for air to be admitted and expelled through their respective valve stems 8. The tube members are equally arranged in the tire casing in overlapping relation as shown in Figure 3 of the drawing with the valve stems protruding through openings appropriately formed in spaced relation on the rim 6 and each section is of a length to extend approximately two-thirds of the circumference of the casing. One end 12 of the tube 9 is disposed beneath the end 13 of the tube 10 and the other end 14 of the tube 9 rests over the end 15 of the tube 11. The end 16 of the tube 11 overlaps the end 17 of the tube 10 and when placing said tubes in the tire casing, they are in a substantially deflated condition.

After placement in the casing, each tube members is inflated to the required pressure, in accordance with the size of the tire, so that each will carry the same volume of air under the same pressure. If, for example, the size of the tire 5 is such that it requires an air pressure of 27 pounds, in order to be properly inflated, the tube members are partially inflated in an alternate manner, until the pressure in each is 27 pounds by gauge test, and when completely inflated to the required pressure, said tube members will assume a position substantially as shown in Figure 2 of the drawing.

Figure 4:
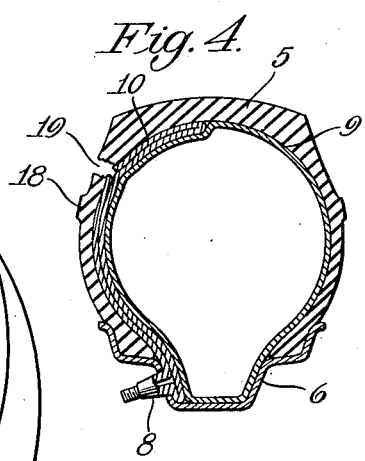
Figure 4 is a detail sectional view taken substantially on line 4—4 of Figure 1 illustrating the invention in use.

By overlapping the tubes in the manner illustrated and described, extra protection is afforded in the event that the tire becomes punctured or blown out. Should a puncture or blow-out occur, only one of the tube members, in all probability, would be affected and deflated. In Figure 4 of the drawing, the tire 5 is illustrated with its side wall 18 damaged by a blow-out causing a rupture 19 of said wall and a consequent puncture of the tube member 10. The tube member 10 has, of course, become deflated and the members 9 and 11 have expanded to fill the void created by the deflation of the tube member 10. The deflated member 10, however, will be forced against the inner wall of the casing and against the aperture 19, serving as a blow-out patch or shoe to protect the member 10. With the deflation of the tube member 10, it is understood that the pressure in the tire has been reduced, but sufficient pressure remains in the tube members 9 and 11 for the vehicle to continue on its journey and without danger of the tire becoming entirely deflated.

It is, of course, to be understood that the positioning and arrangement of the triple tubes within the tire casing is such that all areas of the tire are protected against a blow-out. In other words, a puncture occuring on the periphery of the tire would deflate only one tube member with the remaining members expanded in the manner previously described. The same is true of all areas of either side wall of the tire.

Figure 2:
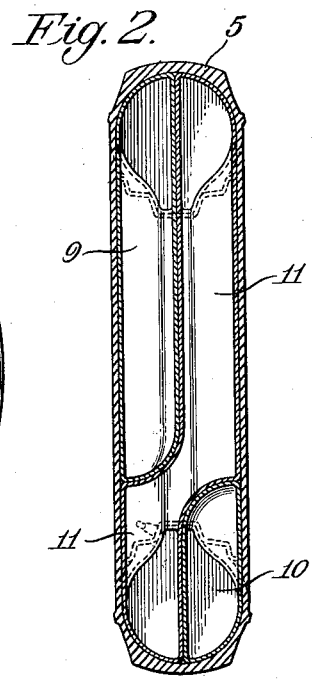
Figure 2 is a vertical sectional view taken substantially on line 2—2 of Figure 1.

My tube members not only afford protection in the manner as above described, but they likewise prolong the life of the casing, due to the circumferential center supporting rib for the tread portion of the casing, as best shown in Figure 2 and which is brought about by the overlapping association of said members, consequently the tread portion is not only sustained by the side walls, but also by the center rib, thus relieving to a great extent the strain to which the side walls are subjected, when an ordinary tube is used.

My tube members likewise increase the riding comfort of a tire, because of the fact that they act in the capacity of air cushions, that is they confine the air within separated areas and thereby prevent the air from racing about a circumferential path, as it does in the ordinary circular tube.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claim.

What is claimed is:

In a pneumatic tire, the combination with a casing, of three independent tube sections mounted within the casing, each section being of elongated arcuate formation and extending approximately two-thirds of the circumference of the casing, said sections being equally arranged within the casing and disposed in alternate side by side relation for the adjacent end-portions thereof to overlap each other for approximately one-half the length of the sections, and a valve stem for each tube section and secured to and extending laterally from adjacent one end thereof.

EDWARD R. MAYER, Sr.